Sept. 6, 1960 W. D. CHILTON 2,951,516
FASTENER DRIVING TOOL WITH HOPPER AND FEED MEANS
Filed July 9, 1958 3 Sheets-Sheet 1

INVENTOR.
William D. Chilton
BY
J. C. Thorpe
ATTORNEY

Sept. 6, 1960 W. D. CHILTON 2,951,516
FASTENER DRIVING TOOL WITH HOPPER AND FEED MEANS
Filed July 9, 1958 3 Sheets-Sheet 2
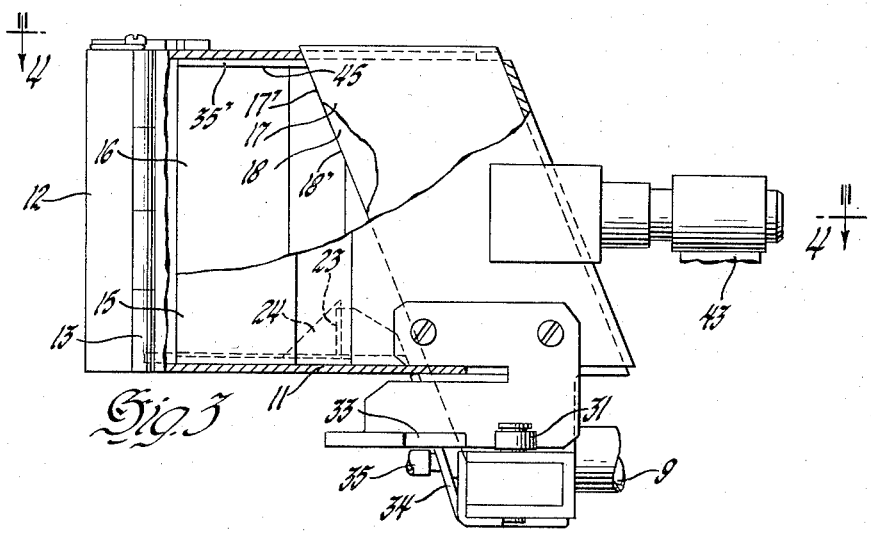
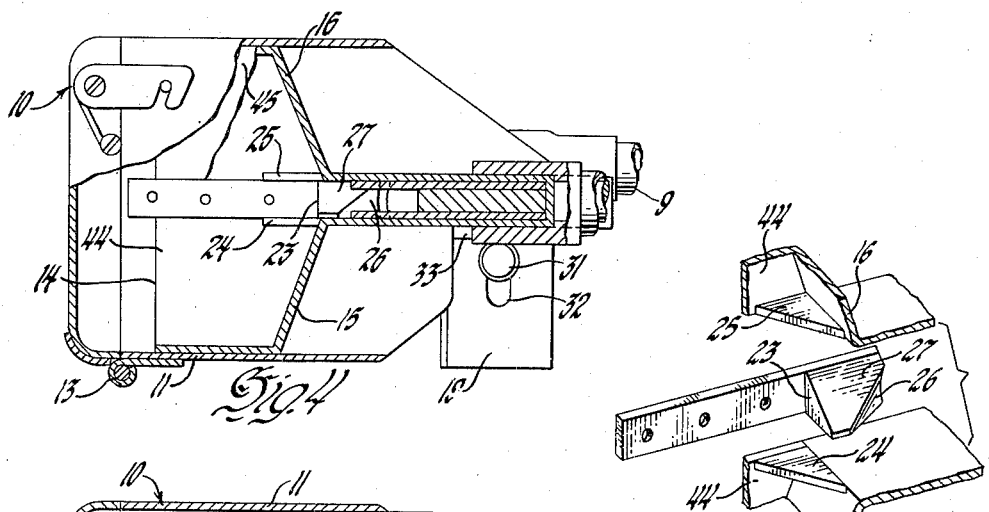
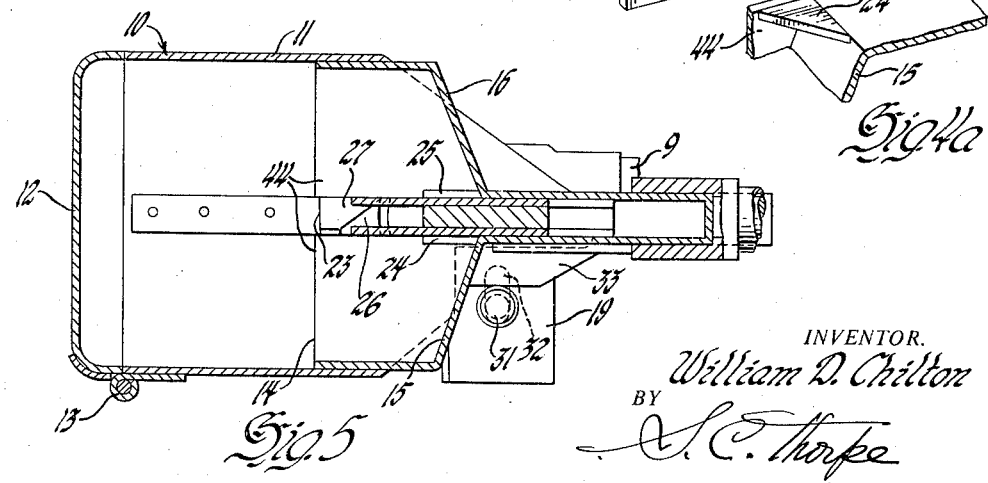
INVENTOR.
William D. Chilton
BY
S. C. Thorpe
ATTORNEY Sept. 6, 1960 W. D. CHILTON 2,951,516
FASTENER DRIVING TOOL WITH HOPPER AND FEED MEANS
Filed July 9, 1958 3 Sheets-Sheet 3
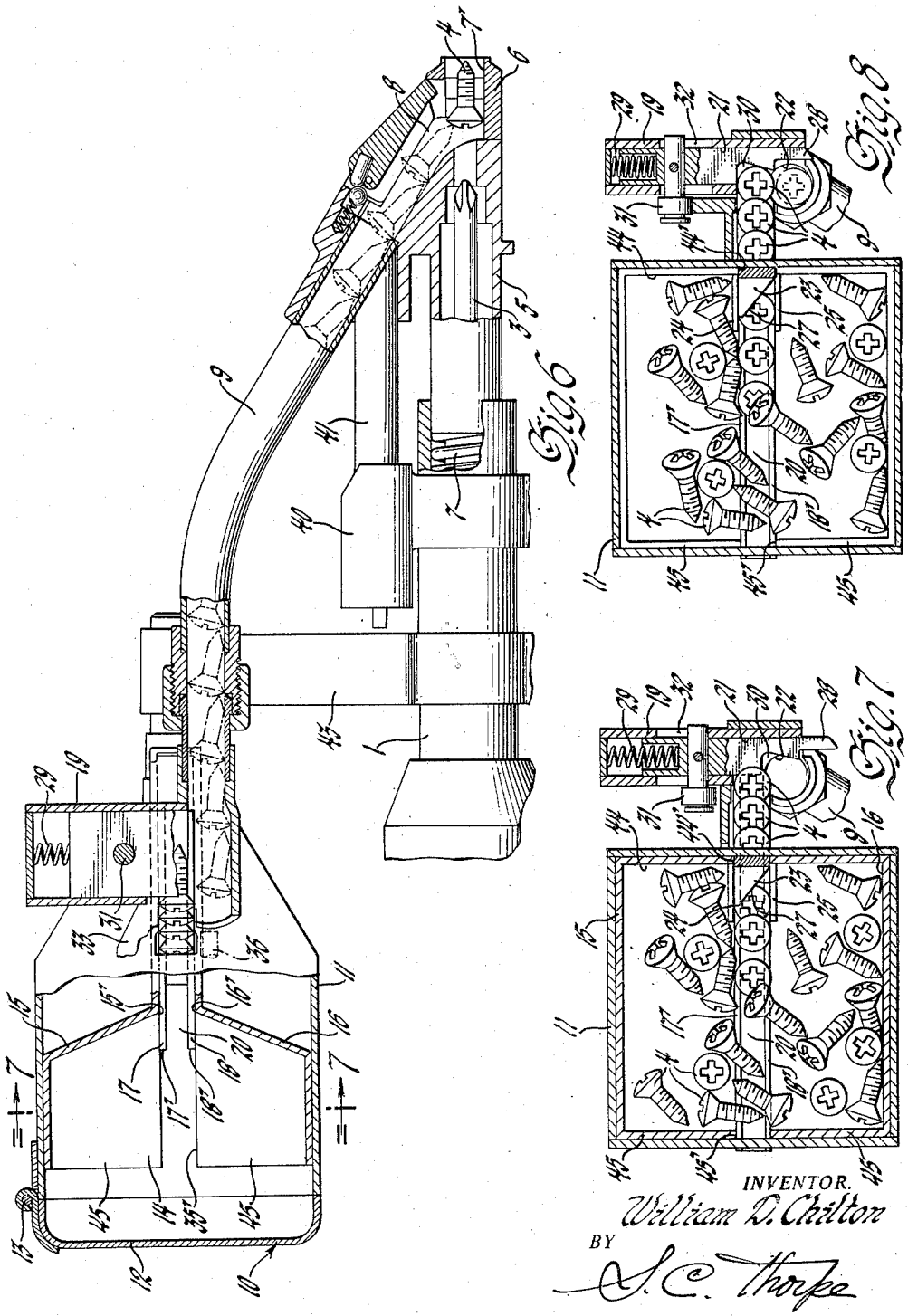
INVENTOR.
William D. Chilton
BY
J. C. Thorpe
ATTORNEY

United States Patent Office 2,951,516
Patented Sept. 6, 1960

2,951,516

FASTENER DRIVING TOOL WITH HOPPER AND FEED MEANS

William D. Chilton, Royal Oak, Mich., assignor to General Motors Corporation, Detroit, Mich., a corporation of Delaware Filed July 9, 1958, Ser. No. 747,423

9 Claims. (Cl. 144—32)

This invention relates to tools for driving fasteners in combination with hopper and feed means for delivering fasteners into position for driving.

It is the principal object of the invention to combine a fastener driving tool with a hopper and feed means whereby advancement and retraction of the tool in operation relative to the work functions to select fasteners within the hopper and position them for driving by the tool.

It is a further object of the invention to provide such a tool with air propulsion means for effecting delivery of the fasteners from the hopper into position for driving.

Although not limited thereto in its broadest aspects the invention has particularly advantageous application to power operated screwdrivers of the portable type which are maneuvered toward and away from the work in the course of driving successive screws. A hopper is arranged for movement with the tool and has a screw orienting piece therein which selects screws in similar end-wise relation for guided delivery to a retractible nose piece located forwardly of the screw driving end of the tool. When the nose piece is placed in abutment with the work, further movement of the tool towards the work effects relative retraction of the nose piece which moves the orienting piece relatively upwardly within the hopper, thereby agitating the screws in the hopper and orienting additional ones thereof into proper end-wise relation for subsequent delivery to the nose piece.

Various other objects and advantages of the invention will be apparent from the following description of a preferred embodiment thereof, having reference to the drawings wherein:

Figure 3 is an enlarged side elevational view of the hopper taken in the direction of the arrows 3—3 in Figure 1, with portions broken away and in section.

Figure 4 is a part section and part elevational view taken substantially along the line 4—4 of Figure 3.

Figure 4a is an exploded fragmental view in perspective of the parts which prevent jamming of screws within the hopper.

Figure 5 is a view similar to Figure 4 but showing the hopper and screw orienting parts in their relative positions when the tool is advanced for driving screws into the work.

Figure 6 is an enlarged view similar to Figure 1, with additional portions broken away and shown in section substantially along the line 6—6 of Figure 2.

Figure 7 is a sectional view taken substantially along the line 7—7 of Figure 6, and showing the hopper and associated screw orienting and feed parts in their normal relative positions, and showing screws within the hopper and feeding therefrom.

Figure 8 is a view similar to Figure 7 but showing the parts in their relative positions when the tool is fully advanced into driving position with the work.

Figures 1, 2:
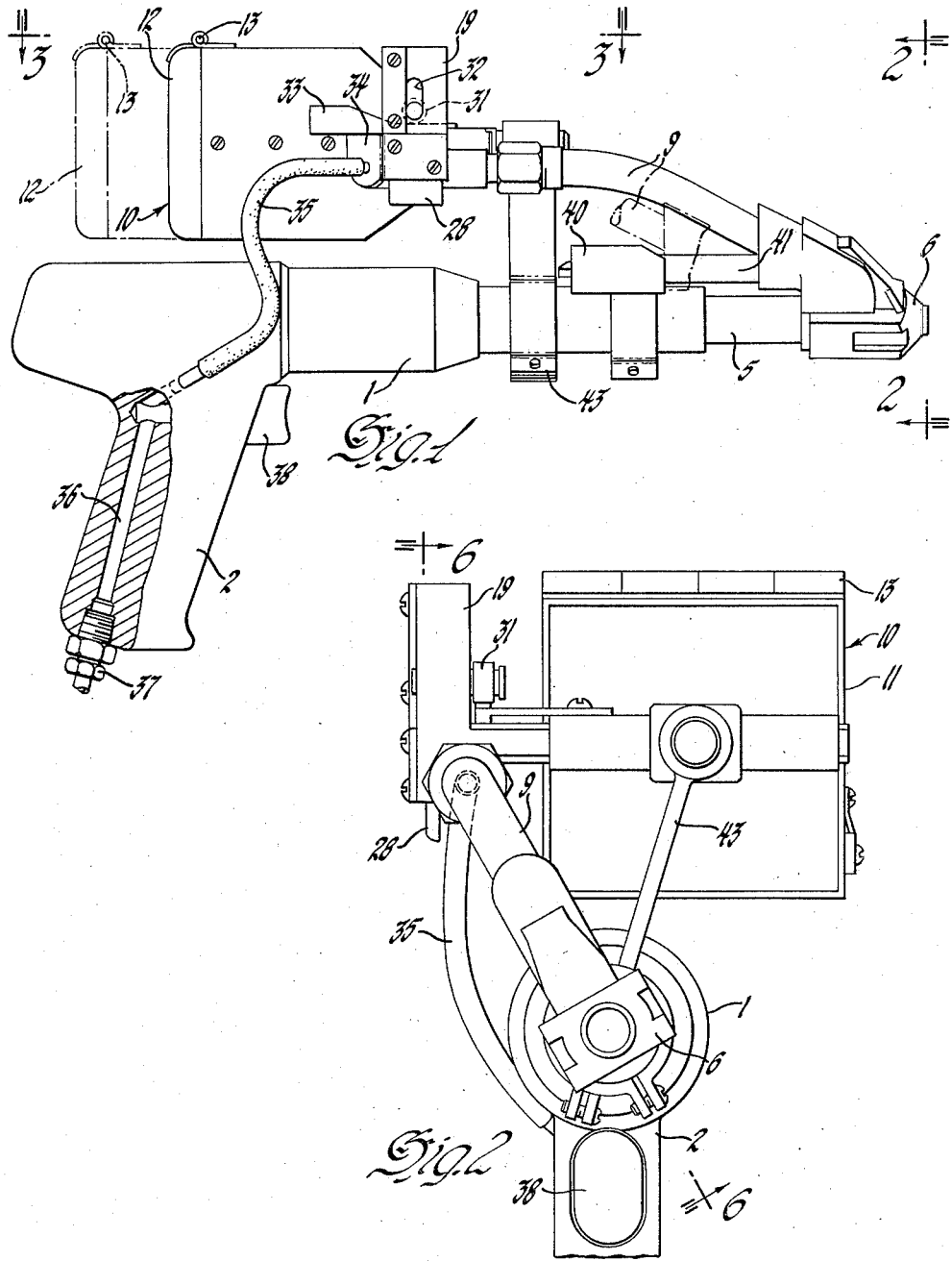
Figure 1 is a side elevational view of a power screw driving tool with its attached hopper and feed tube shown by solid lines in their normal relative positions, a portion of the tool nose and its connecting feed tube being also shown by broken outline in their retracted positions, and showing a portion of the tool handle broken away and in section.
Figure 2 is an enlarged end elevational view taken in the direction of the arrows 2—2 of Figure 1.

Referring now in detail to the drawings, a tool is shown having a support in the form of a housing 1 with a handle 2. Extending from the opposite end of the housing is a driving member 3 (Figure 6) in the form of a bit for driving recessed headed screws 4 (Figures 7 and 8) into a work piece, not shown. The particular tool illustrated is of the pneumatically actuated type having a rotary air motor enclosed within the housing and connected to the bit 3, however, the details of the bit driving means form no part of the invention and are not disclosed.

In normal operation the housing 1 and bit 3 extend generally vertically toward the work, and slidably telescoping within the lower end of the housing is a sleeve-like part 5 which surrounds the bit and terminates in a nose piece 6. Spring means 7 tends to bias the nose piece beyond the lower end of the bit as shown in Figure 6, and within the nose piece is a bore 7' in which is positioned each screw to be driven. A lateral opening 8 into this bore connects with a rigid tube 9 whose internal side walls form means for guiding screws from a hopper generally indicated by the numeral 10. Additionally supporting the nose piece and keying it against rotation about the housing is a bracket 40 fixed to the housing and slidably receiving a pin 41 fixed to the nose piece. Abutment between this bracket and the nose piece limits movement of the nose piece toward the housing.

The hopper comprises an outer basket 11 having a top cover 12 hinged thereto at 13. Slidably fitting the inner side walls of the outer basket is an inner basket 14 fixed as by a bracket 43 to the housing and having an outlet formed by converging bottom walls 15, 16 whose lower ends terminate in spaced apart relation and slidably embrace a pair of spaced upstanding walls 17, 18 forming a screw orienting piece. These upstanding walls 17, 18 are fixed to and extend through the sides of the outer basket as best illustrated in Figures 7 and 8 and connect rigidly with a transfer-passage forming member 19 and also with the upper end of the feed tube 9. The upper extremities of these upstanding walls are inclined downwardly toward the transfer-passage member 19 and thus define a ramp 17', 18' along which the screws within the inner basket tend to gravitate. The spacing between these walls 17, 18 is such as to slidably receive the shanks of the screws while retaining the heads of the screws from passing vertically therebetween. The slot 20 thus formed by the walls 17, 18 is open at its lower end to a transfer passage 21 in the member 19, which extends transversely from the slot 20 and makes connection with a second passage 22 which forms the upper end of the tube 9.

With the nose piece 6 in its extended position relative to the housing, the walls 17, 18, for the most part, terminate substantially below the inner basket bottom walls 15 and 16; however, as shown in Figure 3, the portion of these walls adjacent the upper end of the ramp 17', 18' may extend upwardly into the inner basket. Opposite ends of the converging bottom walls 15, 16 of the inner basket may connect with side walls 44 and 45 slotted as at 44', 45' for clearance with the orienting walls 17, 18. Upon moving the tool housing toward the work after the nose piece is in abutment therewith the walls 17, 18 move upwardly relative to the inner basket 14, causing screws within the inner basket to be agitated, and some of them whose shanks are aligned with the slot 20 to be picked up and to gravitate toward the passage 21.

Means are provided within the inner basket above the ramp 17', 18' to cam away those screws whose shanks are in crossed relation to the slot 20, or are otherwise unable to orient themselves with those screws passing out of the hopper. Such means is provided in the form of an ejector 23 fixed to the outer basket for movement with the orienting walls 17, 18. As best seen in Figures 4, 4a, 5, 7 and 8, this ejector extends into the inner basket between two upstanding projections 24, 25 which are fixed to the bottom walls of the inner basket and which closely embrace the orienting walls 17, 18. The lower face 26 of this ejector is spaced above the ramp 17', 18' to clear the heads of those screws which are progressing out of the basket in proper oriented relation. The upper extremities of the projections 24, 25 incline approximately 45° from vertical, and the lower face 26 of the ejector is oppositely inclined from vertical approximately 30°, providing an angle of approach between the ejector and the projections of 75° for deflecting away screws therebetween whose shanks extend cross-wise of the slot 20. Co-operating in this ejecting action is the end face 27 of the ejector which is disposed at approximately 45° to the longitudinal mid-plane of the slot 20, for deflecting unoriented screws off the ramp.

Slidably reciprocable within the transfer passage 21 is a transfer member or shuttle 28 biased by a spring 29 to the position shown in Figure 7 in which the shuttle blocks the outlet end of the screw orienting slot 20. A screw transferring portion in the form of a notch 30 in the side of this shuttle registers with an opening in the side of passage 22 at the upper end of the tube 9 when the shuttle is in this position, and when the shuttle is at the opposite end of its stroke (Figure 8) the notch 30 registers with the slot 20 for receiving the end screw therein. Cooperating cam means is provided for actuating the shuttle against the spring to its Figure 8 position in response to advancement of the tool relative to the nose piece. This cam means is in the form of a roller 31 carried by a pin attached to the shuttle and extending through a slot 32 in the transfer-passage member 19, to engage a cam plate 33 fixed to the inner basket.

A plate 34 (Figures 1 and 3) covers the upper end of the tube passage 22, and connected to an opening in this plate is an air delivery passage shown in the form of an external flexible tube 35 and drilled hole 36 in the handle 2 leading from an air pressure supply connection 37 in the tool handle 2. At 38 is shown the usual trigger valve for controlling air delivery to the screwdriver motor (not shown) within the housing 1, which valve also serves to control air delivery to the flexible tube 35. When this trigger valve is depressed toward the handle, air under pressure from the supply connection 37 is thus delivered to the upper end of the rigid feed tube 9 behind the screw being fed to the nose piece. Air propulsion of such screw to the nose piece enables the tool to be operated with the bit 3 in a horizontal, or even in an inverted position, once such screw has reached the normally upper end of the tube 9.

It will be appreciated that various changes in the form and arrangement of the parts from those shown and described for this single embodiment of the invention may be made without departing from the spirit and scope of the following claims.

I claim:

1. In combination with a tool for driving fasteners into a work piece, said tool including a movable support and a fastener driving member, a fastener positioning nose piece movably mounted on the support opposite said member and adapted to abut the work piece as the support and member are moved toward it to engage the member with the fastener positioned thereby, a hopper fixed to the support and adapted to contain a quantity of fasteners to be driven, said hopper having an outlet for discharge of fasteners and walls cooperating to direct fasteners toward said outlet, and means for guiding fasteners from said outlet to said nose piece, said means being fixed to said nose piece and extending into the hopper through said outlet, whereby as said support is moved toward the nose piece said guiding means agitates the fasteners in the hopper into positions to be guided to the nose piece by said means.

2. In combination with a tool for driving elongated fasteners into a work piece, said tool including a movable support and a fastener driving member, a fastener positioning nose piece resiliently projecting from the support and adapted to abut the work piece as the support and member are moved toward it to engage the member with a fastener positioned thereby, a hopper fixed to the support and adapted to contain a quantity of fasteners to be fed to the nose piece, said hopper having downwardly converging bottom walls terminating in spaced apart relation at their lower ends, a fastener orienting piece including a pair of upstanding spaced walls movable vertically as a unit between the lower ends of said hopper walls and defining an elongated slot to slidably receive fasteners whose longitudinal axes are coplanar therewith, said slot being open at one end, a fastener guideway for conducting fasteners from said slot open end to said nose piece, said guideway rigidly interconnecting the nose piece and the orienting piece, whereby said spaced walls move upwardly and downwardly within the hopper as said housing and member are moved toward and away from the nose piece, and an inclined ramp cooperating with said slot to gravitationally induce movement of fasteners within said slot toward said open end for delivery to said guideway.

3. The invention of claim 2 wherein said guideway includes first and second passages with a connection therebetween at one end of the first passage, said first passage having an opening spaced from said connection accommodating reception of fasteners from said slot, a transfer member slidable in the first passage and having a fastener carrying portion registerable alternately with said opening and said connection by movement of the transfer member, means biasing the transfer member toward said connection, and coacting means on said support and transfer member operative to shift the transfer member against said biasing means to position said portion in registry with said opening in response to movement of the support toward the nose piece.

4. The invention of claim 2 wherein said guideway includes a first passage extending transversely from the open end of the slot and a second passage connecting the extended end of said first passage with the nose piece, said first passage having a transfer member slidable longitudinally therein through a stroke equal to the distance between the slot open end and said second passage, said transfer member having a fastener carrying portion registering respectively with the slot open end and second passage at opposite ends of said stroke, means biasing the transfer member to that end of its stroke at which said fastener carrying portion registers with the second passage, and coacting means on said support and transfer member operative to actuate the transfer member to the opposite end of its stroke in response to movement of the support toward the nose piece.

5. The invention of claim 1 together with an air pressure supply connection on said tool, an air delivery passage connecting said supply connection to said guiding means adjacent said outlet, and a valve normally blocking said delivery passage but openable to accommodate air flow therethrough whereby air pressure may be applied to propel a fastener via said guiding means to said nose piece from said outlet.

6. The invention of claim 2, together with upward projections on said bottom walls slidably embracing said parallel walls adjacent the open end of the slot, and a fastener ejector fixed to the support and extending into the hopper between said projections, said ejector having faces angularly disposed to said ramp and the upper extremities of said projections, whereby fasteners in crossed relation to said slot are cammed away from the slot during relative movement of the orienting piece and hopper to prevent interference with other fasteners entering the slot.

7. In combination with a power screwdriver for headed screws, said screwdriver having a housing with a driving bit extending therefrom, a screw positioning nose piece embracing the bit and slidably mounted at one end on the housing, said nose piece having its opposite end adapted to abut the work in advance of moving the housing and bit further toward the work to engage the bit with a fastener to be driven, spring means operative between the housing and nose piece tending to retract the housing and bit from said opposite end of the nose piece, a hopper carried by the housing and fixed against relative movement therewith longitudinally of the bit, said hopper having downwardly converging walls terminating in spaced apart relation at their lower ends, a fastener orienting piece including a pair of upstanding spaced walls movable vertically as a unit between the lower ends of said hopper walls and defining an elongated slot to slidably receive the shanks of the screws, the upper extremities of said spaced walls defining a screw head retaining ramp and being inclined downwardly toward one side of the hopper to induce gravitation of the screws therealong, and means for raising and lowering said orienting piece in the hopper in response to movements of said housing toward and away from the nose piece, respectively, said last named means including a rigid tube slidably guiding endwise passage of the screws therethrough and fixed at its opposite ends to the nose piece and said spaced walls adjacent the lower end of said ramp.

8. The invention of claim 7, together with an air pressure supply connection to said tool, an air delivery passage connecting said supply connection to said tube at its ramp adjacent end, and a valve openable to permit air flow through the passage to propel fasteners through the tube to the nose piece.

9. The invention of claim 7, together with upward projections on said converging walls adjacent said one side of the hopper, said projections being spaced apart to closely embrace said pair of spaced walls when said spaced walls are in their upper position relative to the hopper, and an ejector movable between said projections with said spaced walls, said ejector having faces angularly disposed to said ramp and the upper extremities of said projections for camming screws off the ramp whose shanks are out of position to enter said slot.

References Cited in the file of this patent
UNITED STATES PATENTS

| | | |
|---|---|---|
| 2,328,383 | Lea et al. | Aug. 31, 1943 |
| 2,534,140 | Moore | Dec. 12, 1950 |
| 2,544,165 | Krasnow | Mar. 6, 1951 |
| 2,605,792 | Havener | Aug. 5, 1952 |
| 2,638,945 | Austin | May 19, 1953 |
| 2,706,504 | Moore | Apr. 19, 1955 |
| 2,754,860 | Moore et al. | July 17, 1956 |
| 2,772,426 | Bailey et al. | Dec. 4, 1956 |
| 2,803,274 | Zubal et al. | Aug. 20, 1957 |